Patented Feb. 4, 1947

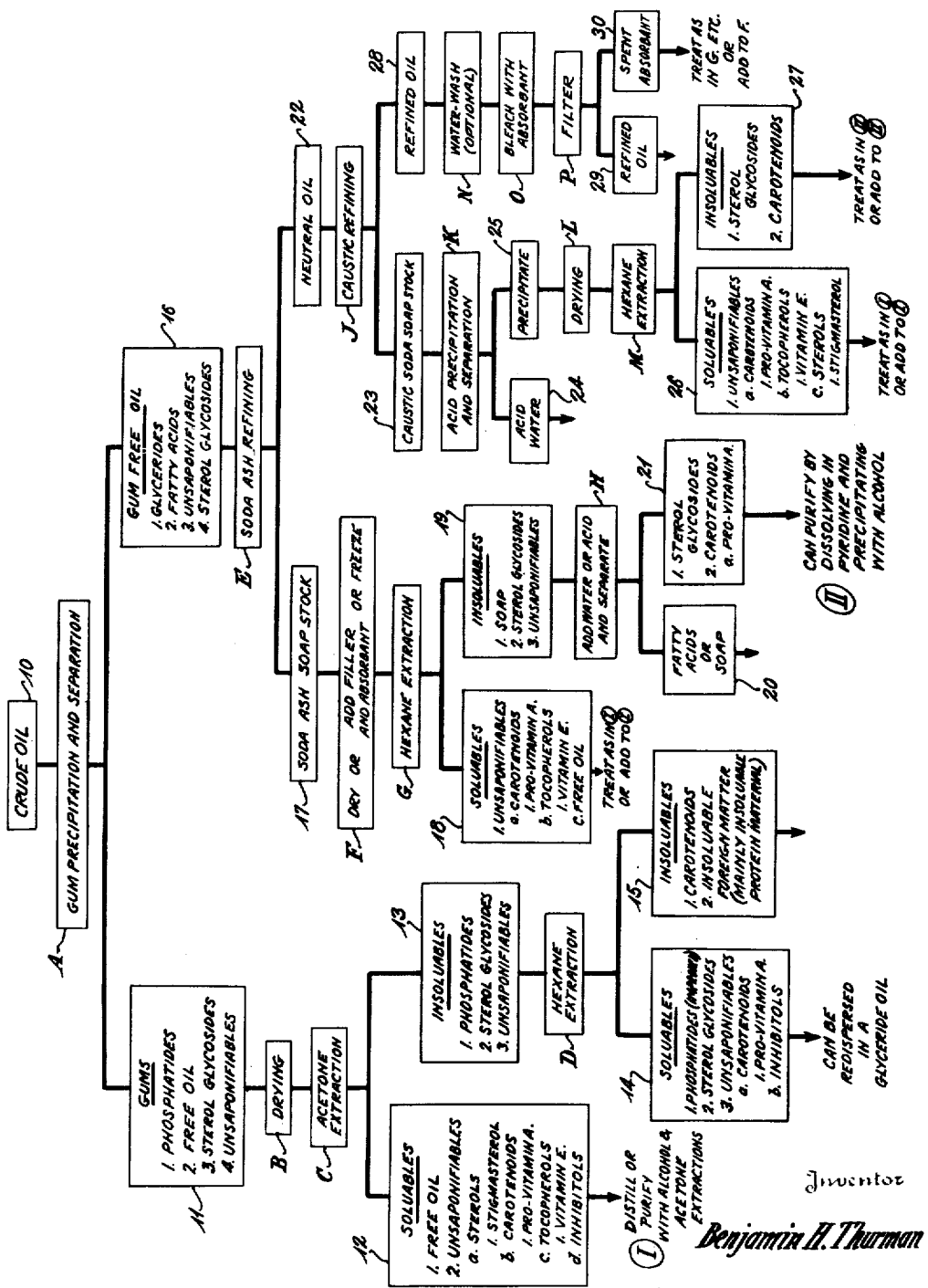

2,415,313

UNITED STATES PATENT OFFICE 2,415,313

RECOVERY OF VALUABLE FRACTIONS FROM GLYCERIDE OILS

Benjamin H. Thurman, Charlotte, N. C., assignor, by mesne assignments, to Benjamin Clayton, doing business as Refining Unincorporated, Houston, Tex.

Application September 20, 1943, Serial No. 503,138

14 Claims. (Cl. 260—210)

This invention relates to the recovery of valuable fractions from glyceride oils and more particularly to a method by which a number of valuable constituents usually present in small amounts in glyceride oils are recovered as an incident to a rapid and economical refining process without the destruction of the oil or of other valuable constituents. The invention also relates to an improved phosphatide product substantially free of sterols and other unsaponifiables.

The present invention is particularly applicable to the treatment of vegetable oils and will be specifically described with reference thereto. In accordance with the invention the crude oil is first subjected to an operation involving the precipitation of gums in the oil with water or a weak solution of an electrolyte and separation of the gums from the oil. These separated gums are processed without alkali treatment to recover therefrom such valuable constituents as unsaponifiables including sterols such as stigmasterol, carotenoids such as pro-vitamin A, tocopherols such as vitamin E and inhibitols to produce improved phosphatides substantially free of unsaponifiables.

The degummed oil is then subjected to a refining step with a non-saponifying alkali such as soda ash. The soapstock from such a refining step with a non-saponifying alkali is substantially free of gums such as phosphatides but contains substantial amounts of other valuable constituents such as those mentioned above as well as sterol glucosides. These constituents may be recovered from the resulting soapstock by the employment of relatively inexpensive solvents because of the absence of gums therein and, if desired, certain of the intermediate products of the soapstock treatment may be added to similar products in the gum treatment procedure so as to in part combine these two operations.

Furthermore, the neutral oil from the soda ash or other non-saponifying alkali refining operation still contains a substantial amount of the valuable constituents referred to, other than phosphatides. This oil is then subjected to a caustic alkali refining operation to produce a soapstock of small volume containing only a small amount of soap and a high concentration of the valuable minor constituents of the oil including unsaponifiables and sterol glycosides. This soapstock is also substantially free of gums such as phosphatides and may be treated with inexpensive solvents to recover the valuable constituents therein. Even the refined oil from the caustic alkali refining step contains an appreciable amount of valuable minor constituents which may be substantially completely removed from the oil by subjecting the oil to a bleaching step with an adsorbent such as fuller's earth, activated clay, etc. The spent adsorbent, preferably after being steamed to remove free oil, may be likewise treated with inexpensive solvents to recover the valuable constituents therefrom. This may be effectively carried out by adding the spent adsorbent to the soda ash soapstock at an early stage of the treatment thereof as not only are the valuable constituents in the spent adsorbent thereby recovered but the presence of the spent adsorbent materially aids in the solvent treatment of the soda ash soapstock.

Thus the present invention presents a unified process of recovering substantially all of the valuable materials in vegetable oils without degradation or destruction thereof, as part of a refining process producing a high quality refined oil with substantially theoretical minimum refining losses. This is made possible, in part, by the facts that the valuable minor constituents are concentrated in the various products separated directly from the oil and that the major impurities are divided between these various products so as to render the products particularly susceptible to further separation operations. Not only are the valuable minor constituents, referred to above, recovered in marketable form but high quality soap or fatty acids can also be recovered from the soapstocks and the phosphatides recovered from the gums are free from undesirable materials and in many cases are lighter in color and are usually substantially free of coloring matter causing staining of other materials even if recovered from a highly colored oil such as cottonseed oil or soya bean oil.

It is, therefore, an object of the present invention to provide an improved process of recovering valuable minor constituents from glyceride oils.

Another object of the invention is to provide an improved process by which a high quality refined oil is produced from glyceride oils with substantially minimum theoretical losses while at the same time recovering the valuable minor constituents in marketable form.

Another object of the invention is to provide a process of rapidly producing a high quality refined oil from vegetable oils with low losses while recovering valuable minor constituents as well as improved phosphatides and fatty acids from the materials removed from the oil during the refining operation.

Another object of the invention is to provide an improved combined aqueous and solvent extraction process for recovering valuable minor constituents from glyceride oils in which expensive solvents are employed upon small fractions only of the crude oil and less expensive solvents can be employed in other portions of the process.

Another object of the invention is to provide a method of recovering unsaponifiables and sterol glycosides from vegetable oils as an incident to a low loss rapid refining operation.

Another object of the invention is to provide a refining process for vegetable oils in which an improved phosphatide as well as other valuable constituents are recovered from the oil.

A further object of the invention is to provide an improved phosphatidic material substantially free from unsaponifiables.

A still further object of the invention is to improve the soap stock fatty acids by eliminating therefrom all or a major part of the sterol glucosides that go into the soap stock in ordinary refining procedures.

Other objects and advantages will appear in the following description of a preferred embodiment of the invention given in connection with the attached flow sheet of a process of the present invention.

Referring to the flow sheet, the present invention is adapted to the processing of glyceride oils particularly crude vegetable oils, as indicated at 10. Such vegetable oils may be cottonseed oil, corn oil, soya bean oil, rape seed oil, sunflower seed oil, sesame seed oil, etc. In general, the oil processed may be either an expressed oil or a solvent extracted oil. These oils are similar in properties and impurity content although the portions of the various impurities will vary depending upon the source of the oil and the method of removal from the oil bearing material. In carrying out the present invention it is preferred to first subject the crude oil to a gum precipitating and separation operation, indicated at A, substantially in accordance with that disclosed in my Patent No. 2,150,732 granted March 14, 1939. As disclosed in said patent, the oil is first mixed, preferably in a continuous manner, with a small amount of water such as 2 to 10% or a similar amount of a very dilute solution of an electrolyte, such as an acid, base, or salt. This operation causes the so-called gums, which are largely phosphatides, but which contain substantial amounts of other materials, to be precipitated and the precipitated material is preferably removed from the oil by a continuous centrifugal separation.

The separated gums indicated as 11 contain a substantial amount of free oil, for example 30 to 40%, and lesser amounts of materials which may be broadly classified as sterol glycosides and unsaponifiables. The gums also usually contain a substantial amount of water and in order to separate them into their various constituents it is preferred to first subject them to a drying operation indicated at B. This is preferably accomplished at low temperatures out of contact with the air in a closed chamber such as a vacuum kettle as certain of the constituents are damaged by high temperature particularly in contact with oxygen. Any heat required may be supplied through the walls of the kettle and the temperature is desirably maintained low enough that substantially water only is removed in vapor form from the vacuum kettle. The drying operation is preferably carried out under conditions of vigorous agitation or filming of the material over heated surfaces. Thus, temperatures, ranging between 90 and 150° F. and an absolute pressure of 1 or 2 inches of water are satisfactory during the vacuum drying operation although any drying procedure, such as spray drying under vacuum condition, which will not cause degradation of the valuable materials in the gums, may be employed.

The dried gums are then preferably extracted with a lower aliphatic ketone, for example, acetone, as indicated at C in the accompanying flow sheet. The acetone extraction may be carried out in batch or otherwise, it being understood that in all of the solvent extraction steps of the present invention the extraction may be accomplished by single or repeated batch operations, continuous countercurrent extraction, or any other known or suitable extraction procedures. Depending upon the source of the gums, the amount of solvent required for effective extraction will vary widely, but, in general, will range between 1 and 10 volumes of solvent per volume of material being extracted in any of the extraction steps of the present invention.

As indicated at 12, the solubles in the extract are predominantly free oil and unsaponifiables such as sterols, carotenoids, tocopherols and inhibitols. The sterols are largely stigmasterol in the case of soya bean oil treatment although substantial quantities of other sterols are also present. Also the carotenoids are largely carotene or pro-vitamin A, while the tocopherols are largely alpha tocopherol or vitamin E. The inhibitols are complex compounds having effective anti-oxidant properties. As shown at I the solubles from the acetone extraction step of the dried gums may be separated in known or suitable manner such as by high vacuum or molecular distillation or a relatively good separation may be made by alcohol extractions with various alcohols and at various temperatures. Before subjecting the solubles to any of these processes for separation it is, in general, preferred to remove the solvent such as acetone by vaporization, preferably at low temperature under vacuum to recover the solvent for reuse in the process. No substantial decomposition of the ketone solvent takes place as the gums are distinctly acid and the known decomposition of aliphatic ketones in the presence of alkalies is thereby avoided. The solvent-free solubles from 12 constitute a concentrate of unsaponifiables in vegetable oil and form a marketable product, without further separation or purification, as a raw material for production of vitamins, sterols, anti-oxidants, etc.

The insoluble residue from the acetone extraction step is predominantly phosphatides as shown at 13 but also contains a substantial amount of sterol glycosides, for example, about 6% in the case of corn oil. Also, a detectable amount of unsaponifiables differing somewhat from the usual unsaponifiables typical of vegetable oils are frequently retained in the insoluble residue even after repeated extraction with acetone. The acetone or other ketone is preferably removed from the residue by vacuum distillation and recovered from the use in the acetone extraction, the remaining residue then being preferably subjected to a hexane extraction step as indicated at D. Although hexane is the preferred solvent, it will be understood that other substantially equivalent solvents, for example petroleum ether, benzol, pentane, or even propane under pressure may be employed and by varying the temperature of extraction in accordance with known solvent extraction procedures.

The solubles from the hexane extraction step, as indicated at 14, are largely phosphatides in purified form, relatively free from unsaponifiables. Nevertheless, the solubles will contain small amounts of unsaponifiables such as carotenoids and inhibitols and usually contain a substantial amount of sterol glycosides. These materials do not materially affect the properties of the phosphatides and, in general, it is not desirable to attempt to recover them from the phosphatides. That is to say, the phosphatides are substantially free from the usual or typical unsaponifiables. If desired, however, these phosphatides may be further purified by again subjecting them to acetone extraction which may be in turn followed by hexane extraction, the extract from the acetone extraction being preferably added to the solubles 12. The phosphatides may also, if desired, be separated into alcohol soluble and alcohol insoluble phosphatides by extraction with lower aliphatic alcohols by which considerable amounts of fractions high in free fatty acids and phosphorus are removed.

After removal of the hexane or similar solvent, preferably by evaporation thereof in a vacuum, the phosphatides 14 from the various glyceride oils will usually be recovered as a light colored powder or paste if a light colored oil is being treated. Even if the original oil was dark colored such as cottonseed oil or soya bean oil, the extraction operations substantially remove certain types of coloring matter, for example the carotenoids and xanthophylls which may be present. The substantially pure phosphatides are relatively easily oxidized even though they may contain a small amount of inhibitols and for this reason it is preferred to redisperse the phosphatides in a glyceride oil carrier such as a refined vegetable oil. This can be accomplished by adding the oil to the solubles prior to removal of the hexane or other solvent. If redispersed in a high quality glyceride oil they form an extremely valuable commercial product.

The insolubles indicated at 15 from the hexane extraction step are predominantly insoluble foreign matter such as meal. These insolubles also contain small amounts of unsaponifiables, particularly coloring material such as carotenoids not completely removed in the extraction steps. Any residual hexane or similar solvent may be recovered from the insolubles 15 preferably by vacuum distillation for reuse in the process.

The substantially gum free oil 16 from the precipitation and separation operation A is predominantly made up of glycerides of fatty acids but usually contains a substantial amount of fatty acids and a material amount of unsaponifiables as well as a recoverable amount of sterol glycosides. This oil may be refined as indicated at E with a non-saponifying alkali such as soda ash, preferably by the method disclosed in Clayton Patent No. 2,249,701 granted July 15, 1941. The preferred non-saponifying alkali is soda ash and the sharpest separation of impurities from the oil with the least loss has been produced by the dehydration and rehydration steps disclosed in said patent, the soapstock being separated by continuous centrifugal separation.

This soda ash soapstock 17 from refining operation E may be relatively easily treated with solvents to separate valuable minor ingredients from the soap after conditioning the soapstock as indicated at F. A preferred conditioning operation is to add a filler and absorbent which will absorb water from and dry the soapstock and at the same time make it a relatively porous granular solid thereby assisting in subsequent solvent extraction steps. A preferred filler is an additional amount of soda ash which reacts with the water in the soapstock to form sal soda and condition the soapstock for solvent extraction. However, substantially any other absorbent material such as wood flour, ground peanut hulls, ground straw, cereal flour, dried clay, etc., can be employed as a filler to absorb water and condition the soapstock for solvent extraction. It is particularly advantageous to employ dried spent bleaching earth from a subsequent bleaching operation on the oil as at least a part of the filler since substantial amounts of valuable minor constituents from the oil and contained in the spent earth are thereby recovered. Another alternative step of conditioning the soapstock for solvent extraction is a drying operation preferably performed at relatively low temperatures under vacuum. It is also possible to freeze the soapstock to form a friable solid. Such friable solid may be easily broken into granular or powdered form for the solvent extraction step. Various combinations of these alternative conditioning procedures such as partly drying and adding a filler or partly drying and freezing, etc., may also be employed. While the present invention is particularly concerned with substantially gum free soapstocks, these conditioning procedures are also applicable to soapstocks containing gum.

In accordance with the present invention the conditioned soapstock is then preferably extracted with hexane or other similar solvents as indicated at G. Although hexane and the similar solvents mentioned are not an effective solvent for soapstock which contains substantial amounts of gums as it tends to form a gummy inseparable mass, the removal of the gums in the degumming operation of the present invention enables hexane or a similar inexpensive solvent to be efficiently employed. It is possible to employ acetone or other similar ketone upon the soapstock of the present invention but the employment of such expensive solvent is not necessary and furthermore trouble is experienced with decomposition of such solvents in the presence of the alkali in the soapstock.

The solubles removed from the insoluble residue in the hexane extraction are indicated at 18 and are predominantly unsaponifiables such as carotenoids and tocopherols. In general the soapstock formed in a soda ash refining operation contains a small amount of free oil and this free oil will also appear in the solubles if not previously saponified in the soapstock. A drying operation will ordinarily substantially completely saponify the free oil as an excess of soda ash or other alkali is ordinarily employed in the non-saponifying alkali refining step in which case no substantial amount of free oil appears in the solubles. The solubles usually contain relatively large amounts of sterols such as carotenoids and tocopherols and also usually contain inhibitols. After removal of the hexane or other solvent from the solubles the residue may be sold as a concentrate or treated as in step I, or the solubles from 18 may be added to the solubles at 12.

The insolubles 19 from the hexane extraction step are predominantly soap although a substantial amount of sterol glycosides are usually contained therein along with a small amount of unsaponifiables not removed in the hexane extraction step. This material can be separated as indicated at H, one method of separating the soap from the sterol glycosides and unsaponifiables being to add sufficient mineral acid, such as sulfuric or hydrochloric acid, to split the soap to produce fatty acids. The fatty acids are of less specific gravity than either the water or the unsaponifiables and glycosides and may be separated by settling or continuous centrifugal separation from the water. Furthermore the glycosides and unsaponifiables are insoluble in the water and upon standing collect as a layer on top thereof. These likewise may be separated from the water by settling or continuous centrifugal separation.

An alternative and many times preferable method of separating the soap from the glycosides and unsaponifiables, is merely to add sufficient water to substantially completely dissolve the soap and precipitate other components, in which case the upsaponifiables and glycosides may be removed from the solution by decantation or centrifugal separation. The result of either of these separations is to separate the fatty acids and water or the soap and water indicated at 20 from the desirable minor constituents indicated at 21. Heavy materials such as earth or clay, which may be employed as a filler in the soapstock conditioning step F or which are added therein to enable extraction of valuable constituents in spent decolorizing earth are heavier than the glycosides or unsaponifiables and separate with the water. A soluble alkali employed as a drying filler likewise separates with the water while lighter filler materials such as wood flour can be filtered from any of the liquid products, elevated temperatures being employed if necessary to insure liquefaction.

The major valuable minor constituents in the insolubles 21 are usually phytosterol glucoside and carotene or pro-vitamin A, the separated material being predominantly phytosterol glucoside, the carotenoids being present in small amounts. This material forms a marketable product as a source of phytosterol glucoside or can be further purified to separate the phytosterol glucoside and carotene by dissolving the material in pyridine and precipitating with alcohol, the precipitate being the phytosterol glucoside. Any carotene recovered from the pyridine and alcohol solution can be returned to the solubles at 12 or separately collected.

When processing certain oils, it may not be desirable to remove the glycosides and unsaponifiables from the insolubles 19 resulting from the hexane extraction G. This material, particularly if no added filler, with the exception of an alkali, has been incorporated thereinto, is an extremely pure soap as the content of glycosides and unsaponifiables is relatively small and does not materially affect the properties of the soap. Thus, if the soapstock from the soda ash refining step E is merely dried or frozen prior to extraction with hexane to recover unsaponifiables the insolubles form a valuable commercial soap product light in color and having good detergent properties. Even if certain fillers, such as clays, are added thereto, this material may be removed by a washing operation in accordance with known soap processing steps in order to produce a high quality soap. In general, however, it is preferred to recover the glycosides and unsaponifiables from this soap as they form valuable products and an even purer soap or fatty acids can thereby be recovered from the process.

The neutral oil, indicated at 22, from the soda ash refining step will usually contain small amounts of glycosides and unsaponifiables although the fatty acids are substantially removed in the soda ash refining step. With highly colored oils, such as cottonseed oil or soya bean oil, a further refining step J with a caustic alkali for removal of this color is desirable. Even with certain light colored oils the caustic refining step is desirable or necessary to condition the oil for effective further processing and in accordance with the present invention produces a material rich in valuable minor constituents. This refining step is preferably carried on in accordance with the process disclosed in the Clayton patent referred to above or in accordance with the disclosure of Clayton application Serial No. 483,953, filed April 21, 1943, the amount and concentration of the caustic depending upon the type of oil being used. The soapstock 23 from the caustic soda refining operation J is, in general, a small amount of an aqueous liquid material highly concentrated in sterol glycosides and unsaponifiables and contains only a small amount of soap. It has been found that substantially all of the materials can be precipitated from the water by addition of acid, as indicated at K, in insufficient amounts to split the soap into fatty acids and alkali salts. In other words, if a mineral acid, preferably in relatively dilute form, is added to the caustic soda soapstock a solid precipitate forms which can be filtered, decanted or centrifugally separated from the acid water 24. The precipitate 25 contains only a small amount of soap the remainder being largely unsaponifiables and sterol glycosides. The unsaponifiables may be easily separated from the glycosides and soap, the preferred steps of accomplishing this being to dry the precipitate as indicated at L, the drying preferably being carried out in vacuum at relatively low temperatures. The dried material is then preferably extracted with hexane or similar solvents listed above, as indicated at M, and the solubles are substantially all unsaponifiables including the carotenoids, tocopherols and sterols. In fact, the unsaponifiables content of the soluble material will usually run as high as 80 to 90% of which 1.25 to 2.5% will usually be alphatocopherol or vitamin E. The solubles after removal of the hexane, preferably by evaporation in vacuum, may be treated by distillation or purification with alcohol extractions in accordance with step I or may be added to the solubles at 12 from treatment of the gums. The insolubles 27 from the hexane extraction step M are a relatively pure form of sterol glycosides, predominantly phytosterol glycosides with a small amount of carotenoid pigment and may contain a small amount of soap. This material after removal of hexane may be sold as a valuable commercial product or may be further purified as in step H by dissolving in pyridine and precipitating with alcohol. Alternatively, this material may be added to the insolubles fraction at 21 from the soda ash soapstock treatment. Prior to adding to the insolubles, any soap may be removed by washing with water.

The refined oil indicated at 28 from the caustic soda refining step J also contains recoverable amounts of valuable minor constituents including, particularly when treating highly colored oils, a recoverable amount of pro-vitamin A. In order to remove residual soap from the refined oil it is desirable to first water wash and dry the oil as indicated at N, but this step is optional as the residual soap and moisture will likewise be removed from a refined oil in a bleaching operation indicated at O. Such bleaching operation usually takes the form of adding an adsorbent, such as fuller's earth, activated clay, certain artificially prepared silicates in finely divided form, etc., and filtering. A relatively small amount of this bleaching material is usually added to the oil and agitated therewith at a relatively high temperature and then the oil filtered from the bleaching material as indicated at P. The filtering step usually also includes steaming of the spent adsorbent to remove residual free oil as far as practicable. The refined and bleached oil is the major valuable product from the refining operation and after a deodorizing treatment is ordinarily used as an edible oil, particularly after hydrogenation treatment to convert it to a semi-solid fat.

The spent adsorbent from the bleaching operation also contains recoverable amounts of unsaponifiables. Thus this material may be dried and subjected to hexane extraction as indicated at G and thereafter subjected to steps substantially the same as those indicated at 18, 19, H, 20 and 21. The spent adsorbent 30 is, however, a desirable addition to the soda ash soap stock at F and after drying forms a particularly desirable filler and adsorbent for the water in the soapstock so that this soapstock is made more open in texture and more susceptible to hexane extraction. The spent adsorbent will of course appear in the insolubles in step 19 and may be separated therefrom in the separation step H by gravity or filtration. By either independently extracting the spent adsorbent with hexane or running it through the hexane extraction step with the soda ash soapstock, additional amounts of unsaponifiables, such as carotenoids, are obtained.

From a consideration of the flow sheet of the present invention, it will be understood that the separation of valuable minor constituents from the crude oil or even from the partially refined oil is a difficult operation. Even such drastic steps as caustic refining directly upon the crude oil leaves a very substantial amount of these materials in the refined oil, and furthermore produces a soapstock from which it is difficult to recover the minor ingredients contained therein. Solvent extraction or distillation treatments of crude or partly refined oil are also difficult because of the small concentration of the minor ingredients therein and the large amounts of material which must be handled. It will be further apparent that all of the operations, such as degumming, soda ash refining, caustic refining and bleaching with an adsorbent, remove portions of the valuable minor ingredients and concentrations of these ingredients in the separated materials are very much higher than in the oil itself. By employing a refining operation such as contemplated herein, the refined oil ultimately produced is relatively free of unsaponifiables and sterol glycosides. Certain of these materials, such, for example, as vitamin E, would be valuable ingredients of the refined oil but leaving in such valuable ingredients also entails leaving in other undesirable minor ingredients which affect the quality of the refined oil and also may interfere with hydrogenation and other further treatments of the oil. The refined oil of the present process is, therefore, an improved product. Furthermore, the minor ingredients recovered by the present invention form extremely valuable products and their recovery in accordance with the present invention forms an important source of revenue to the oil refiner. The desirable ingredients in the refined oil after being separated from undesirable ingredients can, if desired, be added back to the refined oil or the edible products produced therefrom.

As stated above, the various fractions removed directly from the oil during processing such as the gums, soda ash soapstock and the caustic soapstock, as well as the material in the spent adsorbent, have a much greater concentration of valuable minor ingredients than is found in the crude oil or in the partially processed oil in the process. Thus, it is possible economically to recover these minor ingredients from the materials removed from the oil during the refining operation by solvent extraction steps in cooperation with the other steps of the present process. The removal of the gums as a first step produces a material relatively high in phosphatides and other desirable minor ingredients and this material is small in volume as compared to the volume of the crude oil so that a relatively expensive solvent such as acetone or similar ketone may be economically employed as an extraction medium. Certain of the materials in the gums interfere with the employment of a less expensive solvent such as hexane for extracting the gums but these materials are soluble in acetone so that they appear in the solubles indicated at 12. The insolubles, after removal of the acetone, are therefore susceptible to hexane extraction for separation of the phosphatides from insoluble foreign matter and carotenoids. The gum precipitating and separation operation however removes the materials interfering with solvent extraction from the crude oil so that the soda ash soapstock, the caustic soapstock, and spent adsorbent are substantially free thereof and may be easily extracted with such solvents as hexane. It is to be understood, however, that in the hexane extraction steps on materials substantially free of phosphatides, such as hexane extraction steps G and M, acetone or other ketones may be employed, but one of the major advantages of the present invention is the fact that the less expensive solvents can be employed in all solvent extraction steps except the first extraction step directly upon the gums. These less expensive solvents are even more desirable than the ketones as ketones tend to decompose in the presence of strong alkalies unless extreme precautions are taken.

In the flow sheet of the present invention no attempt has been made to list all of the materials present in each step of the process. Thus, there will be other sterols than the stigmasterol present and other carotenoids, tocopherols and sterol glycosides than those specifically mentioned, as well as small amounts of materials such as inhibitols not falling in any of these classifications. In each case it has been attempted to set forth the predominant material which can be expected to be present when operating on vegetable oils and in some instances the materials which form the major impurity. The solvent extraction steps, as is usual in solvent operations, are not complete or absolute separations. For example, the acetone extraction of the gums in step C does not completely remove all of the unsaponifiables from the phosphatides and sterol glycosides indicated at 13 although the unsaponifiables in 13 are small in amount as compared with the phosphatides and sterol glycosides.

It will be apparent that the solvent extractions or other separation steps may be repeated or run countercurrent and that in many cases a material is obtained which is similar to a material treated in some other portion of the process so that in any case where two materials of similar characteristics are obtained in different portions of the process they may be combined for further treatment in order to simplify the procedure. Certain of these combined operations have been indicated in the above description of the invention, for example the materials indicated at 12, 18 and 26 may be combined for further distillation or purification by alcohol extractions. The phosphatides indicated at 14 may be again extracted with acetone to remove unsaponifiables therefrom and these unsaponifiables can be added to the materials indicated at 12. The remaining material after further treatment of the insolubles indicated at 21 and 27 with pyridine and alcohol to remove the sterol glycosides therefrom can have the alcohol and pyridine removed by evaporation, preferably in vacuum, and this material may also be returned to the materials indicated at 12.

While the double refining step involving a refining with a non-saponifying alkali followed by refining with a caustic alkali is preferred, as this operation reduces the losses of natural oil over a single alkali refining operation and by the same token produces higher concentrations of unsaponifiables and glycosides in the products removed from the oil, it is possible to employ a single refining step such as a caustic refining step and then treat the soapstock from the caustic refining step in a manner similar to the steps F, G, etc. In a single refining step operating on degummed oil with a caustic alkali, however, it is, in general, difficult to secure adequate separation of the soapstock from the oil without producing an extremely voluminous soapstock and high oil losses. With certain light colored oils it is also possible to use a single refining step with soda ash or other non-saponifying alkali in which case the soda ash soapstock is treated in accordance with the steps, F, G, etc., but no caustic soapstock is produced. This results in a large amount of unsaponifiables and glycosides being recovered in a bleaching or adsorbent treatment but the recovery of desirable products is not as complete since the caustic soapstock is extremely susceptible to treatment for recovery of these valuable minor ingredients and contains them in very concentrated form.

One of the major advantages of the present invention, particularly with vegetable oils, is the production of improved phosphatides even from oils which have a disagreeable taste or odor or are dark in color. Cottonseed phosphatides are examples of materials which are very dark in color as ordinarily recovered but those recovered from cottonseed oil by the present invention are lighter in color and are substantially odorless and tasteless. In common with phosphatides recovered from other oils in accordance with the present invention, they have improved properties since they are substantially free of unsaponifiables and bitter principles.

Although the invention has been particularly described with reference to the treatment of vegetable oils, animal and fish oils contain unsaponifiables and sterol glycosides which are recoverable in a manner substantially similar to that described above.

The term "unsaponifiable" as employed herein is in accordance with common usage in analytical procedure and means materials found in fatty substances which are insoluble in water or in- capable of forming a water soluble soap with alkalies but which are soluble in petroleum ether or ethyl ether.

While I have disclosed the preferred embodiments of my invention, it is understood that the details thereof may be varied within the scope of the following claims.

I claim:

1. The method of treating a crude glyceride oil for the recovery of valuable minor constituents therefrom, which comprises, subjecting said crude oil to a gum precipitation and separation operation including precipitating gums in the oil and an aqueous agent and centrifugally separating the gums from said oil to produce a substantially gum free oil, thereafter subjecting the resulting oil to an alkali refining operation to produce a neutral oil and separate soapstock substantially free from gums from said neutral oil, and extracting said soapstock with a hydrocarbon solvent for extraction of unsaponifiables from said soapstock, and further treating the residue from said solvent extraction to recover a fraction rich in sterol glycosides.

2. The method of treating a crude vegetable oil to recover valuable minor constituents therefrom, which comprises, subjecting said crude oil to a gum precipitation and separation operation including precipitating gums in the oil with an aqueous agent and centrifugally separating the gums from said oil to produce a substantially gum free oil, thereafter subjecting the resulting oil to an alkali refining operation with a non-saponifying alkali to produce a neutral oil and separate a soapstock therefrom, subjecting said neutral oil to a further alkali refining operation with a caustic alkali to separate a second soapstock therefrom and separately solvent extracting said soapstocks to extract fractions consisting predominantly of unsaponifiables.

3. The method of treating a crude vegetable oil to produce a refined oil and recover valuable minor ingredients, which comprises, subjecting said oil to a gum precipitating and separating operation including precipitating gums in the oil with an aqueous agent and centrifugally separating the gums from said oil to produce a substantially gum free oil, thereafter subjecting the resulting oil to an alkali refining operation to produce neutral oil and separate therefrom a soapstock substantially free from gums, treating said soapstock with a hydrocarbon solvent to recover valuable minor constituents other than phosphatides, said last mentioned treatment including conditioning the soapstock for extraction by adding an absorbent material to said soapstock to absorb water therein and produce a solid granular material for solvent extraction, said absorbent including a spent adsorbent containing additional amounts of said minor constituents from an adsorbent bleaching step of a vegetable oil refining process.

4. The method of treating a crude glyceride oil to recover valuable minor constituents therefrom, which comprises, subjecting said oil to a gum precipitating and separating operation including precipitating gums in the oil with an aqueous agent and centrifugally separating the gums from said oil to produce a substantially gum free oil, thereafter subjecting the resulting oil to an alkali refining operation to separate a soapstock substantially free of gums from said oil, and extracting said soapstock with a hydrocarbon solvent to recover unsaponifiables therefrom.

5. The process of treating crude glyceride oils to recover valuable minor constituents therefrom, which comprises, subjecting said oils to a gum precipitating and separating operation including precipitating gums in the oil with an aqueous agent and centrifugally separating the gums from said oil to produce a substantially gum free oil, thereafter subjecting the resulting oil to an alkali refining operation including the separation of a soapstock substantially free from gums from said oil, conditioning said soapstock for solvent extraction by converting the same into a solid granular product, and extracting the conditioned soapstock with a light hydrocarbon solvent to recover unsaponifiables therefrom.

6. The process of treating crude glyceride oils to recover valuable minor constituents therefrom, which comprises, subjecting said oils to a gum precipitating and separating operation including precipitating gums in the oil with an aqueous agent and centrifugally separating the gums from said oil to produce a substantially gum free oil, thereafter subjecting the resulting oil to an alkali refining operation including the separation of a soapstock substantially free from gums from said oil, conditioning said soapstock for solvent extraction by converting the same into a solid granular product, extracting the conditioned soapstock with a light hydrocarbon solvent to recover unsaponifiables therefrom, and treating the residue of said extraction to recover sterol glycosides therefrom.

7. The process of treating crude glyceride oils to recover valuable minor constituents therefrom, which comprises, subjecting said oils to a gum precipitating and separating operation including precipitating gums in the oil with an aqueous agent and centrifugally separating the gums from said oil to produce a substantially gum free oil, thereafter subjecting the resulting oil to an alkali refining operation including the separation of a soapstock substantially free from gums from said oil, conditioning said soapstock for solvent extraction by converting the same into a solid granular product, extracting the conditioned soapstock with a light hydrocarbon solvent to recover unsaponifiables therefrom, and treating the residue of said extraction to recover sterol glycosides therefrom, said last named treating including acidulation of said residue to convert soaps therein into free fatty acids and separation of fractions of the resulting material by difference in specific gravity.

8. The process of treating a glyceride oil to recover valuable minor constituents therefrom, which comprises subjecting said oil to a gum precipitating and separating operation including precipitating gums in the oil with an aqueous agent and centrifugally separating the gums from said oil to produce a substantially gum free oil, subjecting the resulting oil to alkali refining with a non-saponifying alkali to separate a soapstock substantially free from gums from said oil and extracting said soapstock with a light hydrocarbon solvent to recover a fraction consisting predominantly of unsaponifiables.

9. The process of treating a glyceride oil to recover valuable minor constituents therefrom and produce a refined oil, which comprises, subjecting said oil to a gum precipitating and separating operation including precipitating gums in the oil with an aqueous agent and centrifugally separating the gums from said oil to produce a substantially gum free oil, subjecting the resulting oil to a refining operation with a non-saponifying alkali to separate a first soapstock from said oil and produce a neutral oil, subjecting said neutral oil to a further alkali refining operation with a caustic alkali including separation of a second soapstock from said oil, treating said second soapstock with sufficient acid to form a precipitate therein but insufficient to decompose the soap thereof into fatty acids, separating said precipitate from the resulting acid liquid and subjecting said precipitate to solvent extraction to recover separate fractions consisting predominantly of unsaponifiables and sterol glycosides, and recovering additional amounts of said fractions from said first soapstock by steps including a solvent extraction of said first soapstock to extract a fraction consisting predominantly of unsaponifiables, acidulation of the residue from the last-mentioned solvent extraction and separation of a fraction consisting predominantly of sterol glycosides from the acidulated residue.

10. The process of treating a glyceride oil to recover valuable minor constituents therefrom and produce a refined oil, which comprises, subjecting said oil to a gum precipitating and separating operation including precipitating gums in the oil with an aqueous agent and centrifugally separating the gums from said oil to produce a substantially gum free oil, subjecting the resulting oil to a refining operation with a non-saponifying alkali to separate a first soapstock from said oil and produce a neutral oil, subjecting said neutral oil to a further alkali refining operation with a caustic alkali including separation of a second soapstock from said oil, treating said second soapstock with sufficient acid to form a precipitate therein but insufficient to decompose the soap thereof into fatty acids, separating said precipitate from the resulting acid liquid and subjecting said precipitate to solvent extraction to recover separate fractions consisting predominantly of unsaponifiables and sterol glycosides, and recovering additional amounts of said fractions from said first soapstock by steps including solvent extraction of said first soapstock.

11. The process of treating a crude vegetable oil to produce a refined oil and recover valuable minor constituents therefrom, comprising, subjecting said oil to a gum precipitating and separating operation including precipitating gums in the oil with an aqueous agent and centrifugally separating the gums from said oil to produce a substantially gum free oil, subjecting said resulting oil to an alkali refining operation with soda ash to separate a soapstock from said oil and produce a neutral oil, subjecting said neutral oil to a refining operation with a caustic alkali including separating a second soapstock from said oil to produce a refined oil and subjecting said refined oil to a bleaching operation with an adsorbent and separating spent adsorbent from said oil and subjecting said gums, said soapstocks and said spent adsorbent to solvent extraction operations for recovering separate fractions consisting predominantly of unsaponifiables and sterol glycosides.

12. The process of treating a crude vegetable oil to produce a refined oil and recover valuable minor constituents therefrom, comprising, subjecting said oil to a gum precipitating and separating operation including precipitating gums in the oil with an aqueous agent and centrifugally separating the gums from said oil to produce a substantially gum free oil, subjecting said resulting oil to an alkali refining operation with soda ash to separate a soapstock from said oil and produce a neutral oil, subjecting said neutral oil to a refining operation with a caustic alkali including separating a second soapstock from said oil to produce a refined oil and subjecting said refined oil to a bleaching operation with an adsorbent and separating spent adsorbent from said oil and subjecting said gums, said soapstocks and said spent adsorbent to solvent extraction operations for recovering separate fractions consisting predominantly of unsaponifiables and sterol glycosides, said method including the addition of said spent adsorbent to said first soapstock prior to said solvent extraction.

13. The method of treating a crude glyceride oil to recover valuable minor constituents therefrom, which comprises, subjecting said oil to a gum precipitating and separating operation including precipitating gums in the oil with an aqueous agent and separating the precipitated gums from said oil to produce a substantially gum-free oil, thereafter subjecting the resulting oil to an alkali refining operation to separate a soapstock substantially free of gums from the oil, and solvent extracting said soapstock to recover unsaponifiables therefrom.

14. The method of treating a crude glyceride oil to recover valuable minor constituents therefrom, which comprises, subjecting said oil to a gum precipitating and separating operation including precipitating gums in the oil with an aqueous agent and separating the precipitated gums from said oil to produce a substantially gum-free oil, thereafter subjecting the resulting oil to an alkali refining operation to separate a soapstock substantially free of gums from the oil and thereafter recovering unsaponifiables from the separated soapstock.

BENJAMIN H. THURMAN.

REFERENCES CITED

The following references are of record in the file of this patent:

UNITED STATES PATENTS

| Number | Name | Date |
|---|---|---|
| 2,306,547 | Langlois | Dec. 29, 1942 |
| 2,150,732 | Thurman | Mar. 14, 1939 |
| 2,273,045 | Julian | Feb. 17, 1942 |
| 2,296,794 | Kruse, et al. | Sept. 22, 1942 |

---

Certificate of Correction

Patent No. 2,415,313. February 4, 1947.

BENJAMIN H. THURMAN

It is hereby certified that error appears in the printed specification of the above numbered patent requiring correction as follows: Column 12, line 14, claim 1, for the words "oil and" read *oil with*; and that the said Letters Patent should be read with this correction therein that the same may conform to the record of the case in the Patent Office.

Signed and sealed this 6th day of May, A. D. 1947.

[SEAL]

LESLIE FRAZER.
*First Assistant Commissioner of Patents.* produce a neutral oil, subjecting said neutral oil to a refining operation with a caustic alkali including separating a second soapstock from said oil to produce a refined oil and subjecting said refined oil to a bleaching operation with an adsorbent and separating spent adsorbent from said oil and subjecting said gums, said soapstocks and said spent adsorbent to solvent extraction operations for recovering separate fractions consisting predominantly of unsaponifiables and sterol glycosides, said method including the addition of said spent adsorbent to said first soapstock prior to said solvent extraction.

13. The method of treating a crude glyceride oil to recover valuable minor constituents therefrom, which comprises, subjecting said oil to a gum precipitating and separating operation including precipitating gums in the oil with an aqueous agent and separating the precipitated gums from said oil to produce a substantially gum-free oil, thereafter subjecting the resulting oil to an alkali refining operation to separate a soapstock substantially free of gums from the oil, and solvent extracting said soapstock to recover unsaponifiables therefrom.

14. The method of treating a crude glyceride oil to recover valuable minor constituents therefrom, which comprises, subjecting said oil to a gum precipitating and separating operation including precipitating gums in the oil with an aqueous agent and separating the precipitated gums from said oil to produce a substantially gum-free oil, thereafter subjecting the resulting oil to an alkali refining operation to separate a soapstock substantially free of gums from the oil and thereafter recovering unsaponifiables from the separated soapstock.

BENJAMIN H. THURMAN.

REFERENCES CITED

The following references are of record in the file of this patent:

UNITED STATES PATENTS

| Number | Name | Date |
|---|---|---|
| 2,306,547 | Langlois | Dec. 29, 1942 |
| 2,150,732 | Thurman | Mar. 14, 1939 |
| 2,273,045 | Julian | Feb. 17, 1942 |
| 2,296,794 | Kruse, et al. | Sept. 22, 1942 |

Certificate of Correction

Patent No. 2,415,313. February 4, 1947.

BENJAMIN H. THURMAN

It is hereby certified that error appears in the printed specification of the above numbered patent requiring correction as follows: Column 12, line 14, claim 1, for the words "oil and" read *oil with*; and that the said Letters Patent should be read with this correction therein that the same may conform to the record of the case in the Patent Office.

Signed and sealed this 6th day of May, A. D. 1947.

[SEAL]

LESLIE FRAZER.
*First Assistant Commissioner of Patents.*